(No Model.)   2 Sheets—Sheet 1.

W. H. HARRIS.
FILTER.

No. 290,046.   Patented Dec. 11, 1883.

Witnesses:
Edw. J. Brady.
Theo. L. Popp.

W. H. Harris, Inventor.
By Wilhelm & Bonner
Attorneys.

(No Model.) 2 Sheets—Sheet 2.

W. H. HARRIS.
FILTER.

No. 290,046. Patented Dec. 11, 1883.

Witnesses.
Edw. J. Brady
Theo. L. Popp

W. H. Harris, Inventor.
By Wilhelm & Bonner
Attorneys.

WILLIAM H. HARRIS, OF BUFFALO, NEW YORK.

FILTER.

SPECIFICATION forming part of Letters Patent No. 290,046, dated December 11, 1883.

Application filed January 25, 1883. (No model.)

*To all whom it may concern:*

Be it known that I, WILLIAM H. HARRIS, of the city of Buffalo, in the county of Erie and State of New York, have invented new and useful Improvements in Filters, of which the following is a specification.

This invention relates to that class of filters which are designed for filtering saccharine solutions and other liquids under pressure, and more particularly to filters of this class which are composed of a series of filter-plates provided with a central passage for the liquid to be filtered, and grooves or corrugations covered with filter-cloths, through which the filtrate is forced into the grooves.

The object of this invention is to provide supports for the filtering-cloths, which prevent the cloths from being pressed into the grooves of the filter-plates, and to prevent injury of the filter-cloths, and to provide ready means for collecting the filtrate.

My invention consists, to that end, of the improvements which are hereinafter fully set forth, and pointed out in the claims.

Figure 1:
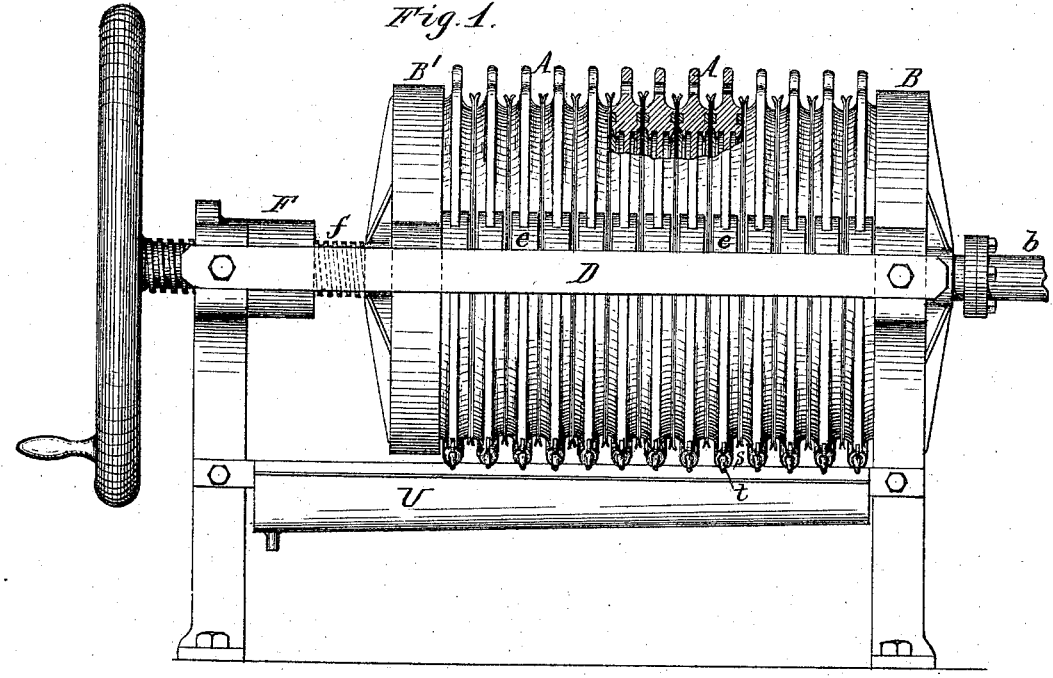
Figure 2:
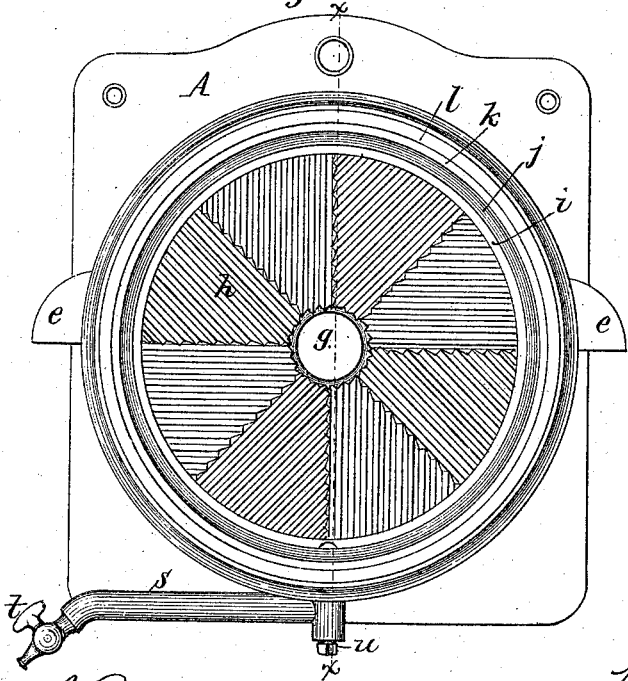
Figure 3:
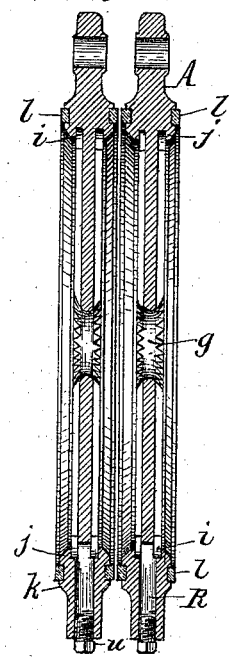
Figure 4:
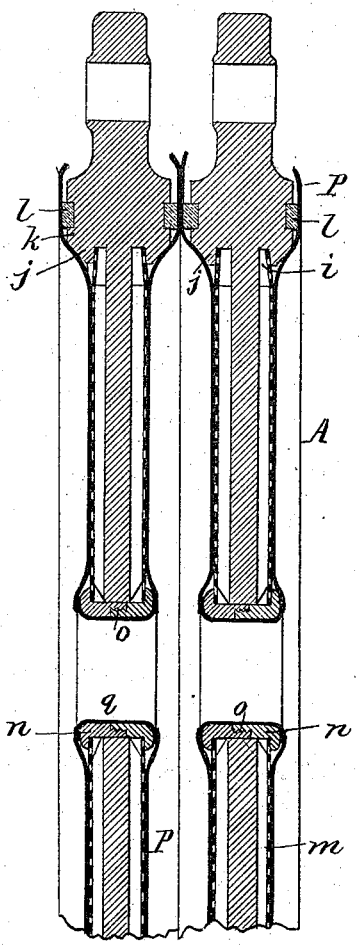
Figure 5:
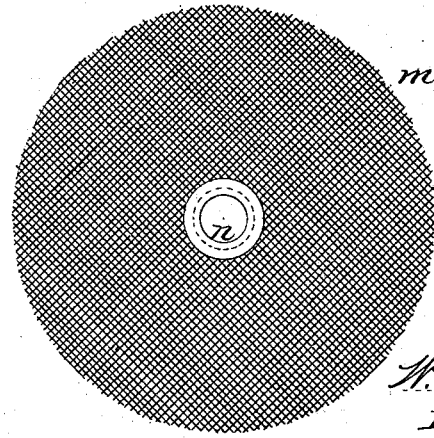

In the accompanying drawings, consisting of two sheets, Figure 1 represents a side elevation of a filter provided with my improvements. Fig. 2 is an elevation of one of the filter-plates on an enlarged scale. Fig. 3 is a vertical section of two of the filter-plates in line $x$ $x$, Fig. 2. Fig. 4 is an enlarged fragmentary section of two of the filter-plates. Fig. 5 is an elevation of one of the supports of the filter-cloths.

Like letters of reference refer to like parts in the several figures.

A represents the filter-plates, arranged face to face with each other; B B', the end plates, arranged against the outer sides of the first and last plates of the series, and $b$ the pipe by which the liquid to be filtered is supplied to the central bore of the end plate B; D, the side bars, upon which the lugs $e$ of the filter-plates rest; F, the stationary screw-nut, and $f$ the screw working therein, whereby the filter-plates are pressed against each other. All of these parts may be arranged in any ordinary and well-known manner.

$g$ represents the central opening formed in each filter-plate for the passage of the liquid to be filtered. $h$ represents the groove or corrugated filtering-surface which surrounds the central opening, $g$. $i$ is an annular groove or depression formed around the grooved filtering-surface $h$. $j$ represents an inwardly-projecting flange, which partly overlaps the groove $i$, and $k$ a raised bearing-surface, which surrounds the flange $j$. All of these parts are preferably constructed as described and shown in Letters Patent of the United States No. 237,525, granted to me February 8, 1881, to which reference is here made for a full description thereof.

$l$ represents a projecting ring, of rubber or other yielding material, seated in an annular groove formed in the raised bearing-surface $k$ of each filter-plate in such manner that when the filter-plates are pressed against each other the elastic rings will clamp the filter-cloths between their elastic surfaces, thereby producing tight joints between the several filter-plates, and at the same time preventing the filter-cloths from being cut or otherwise injured by contact with hard metallic surfaces.

$m$ represents an annular plate, of wire-cloth or perforated metal, which is placed upon the corrugated filter-surface $h$, on each side of the filter-plates. The outer edge of this annular plate is secured by springing it under the projecting flange $j$, which overlaps the groove $i$, as clearly shown in Fig. 4. By this means the outer edges of the perforated plates are prevented from coming in contact with the filter-cloths and cutting or otherwise injuring the same. The two foraminous plates $m$ on opposite sides of the same filter-plate are secured together at the center by a sleeve or thimble, $n$, which is made in two parts connected by a screw-thread, $o$, and provided at its outer ends with flanges which overlap the foraminous plates $m$.

P represents the filter-cloths which rest on the outer side of the foraminous plates $m$. The two filter-cloths on opposite sides of the same filter-plate are connected at the center by a hollow cloth sleeve, $q$, which is sewed with its ends to the inner edges of both filter-cloths. The outer portions of the filter-cloths P are clamped between the projecting rubber rings $l$, as clearly represented in Fig. 4. The foraminous plates $m$ form supports for the filter-cloths and prevent the cloths from being pressed into the grooves of the filter-plates, thereby maintaining at all times a free passage from all parts of the corrugated filtering-surfaces to the marginal groove $i$.

R represents the vertical portion of the filtrate-discharge passage formed in the lower portion of each filter-plate, and connected at its upper end with the annular groove $i$ on opposite sides of the filter-plate.

S represents the laterally-extending portion of the discharge-passage which is formed along the lower edge of each filter-plate, and extends from the vertical discharge-passage R to one side of the plate, where it is provided with a stop-cock, $t$, by which the passage can be closed if the filter-cloth should happen to break. The vertical portion R of the discharge-passage is preferably cast so as to extend to the lower side of the filter-plate, and closed at its lower end by a screw-plug, $u$, for convenience in casting the filter-plates.

U represents a trough which is arranged on one side of the filter, underneath the discharge-orifices of the passage S, for the reception of the filtrate which issues therefrom. This trough is provided with a suitable discharge-pipe for conducting the filtrate to a suitable receptacle. By extending all the discharge-passages to one side of the filter, the troughs which receive the filtrate and the stop-cocks whereby the discharge-passages are controlled are all placed in convenient reach of the operator. The liquid to be filtered enters between the filtering-surfaces through the central passages of the filter-plates, and the liquid is forced through the filter-cloths and the foraminous plates which support the cloths into the grooves of the filter-plates, while the impurities remain between the filter-cloths. The filtrate passes from the grooves of the filter-plates into the annular groove $i$ thereof, and escapes through the discharge-passage into the trough U. In this manner the free and uninterrupted flow of the filtrate from the entire series of filter-plates is insured.

The apparatus can be readily taken apart when it is required to be cleaned.

I claim as my invention—

1. The combination, in a filter, of a series of filter-plates constructed with central supply-openings, $g$, grooved or corrugated filtering-surfaces surrounding the central openings on both sides of each plate, and projecting elastic rings $l$, seated in the marginal flanges of said plates, and filter-cloths which are clamped between said projecting rings, substantially as set forth.

2. The combination, with a filter-plate provided on both sides with grooved or corrugated filtering-surfaces $h$, and a central opening, $g$, of two foraminous plates, $m$, resting against the grooved filtering-surfaces, and a sleeve or thimble, $n$, whereby said foraminous plates are connected at the center, substantially as set forth.

3. The combination, with a filter-plate provided on both sides with grooved or corrugated filtering-surfaces, a central opening, $g$, and an inwardly-projecting marginal flange, $j$, of foraminous plates $m$, resting against said grooved filtering-surfaces, and having their outer edges bearing against the marginal flange $j$ and their inner edges connected by a tubular connection, substantially as set forth.

4. A filter-plate constructed with a central supply-opening, $g$, an annular corrugated filtering-surface, an annular groove, $i$, surrounding the filtering-surfaces, in which the filtrate is collected, and a laterally-extending discharge-passage connected at its inner and upper end with the annular groove $i$ and terminating on one side of the filter-plate, substantially as set forth.

WM. H. HARRIS.

Witnesses:
JNO. J. BONNER,
CHAS. F. GEYER.